Patented May 4, 1926.  BEST AVAILABLE COPY  1,583,651

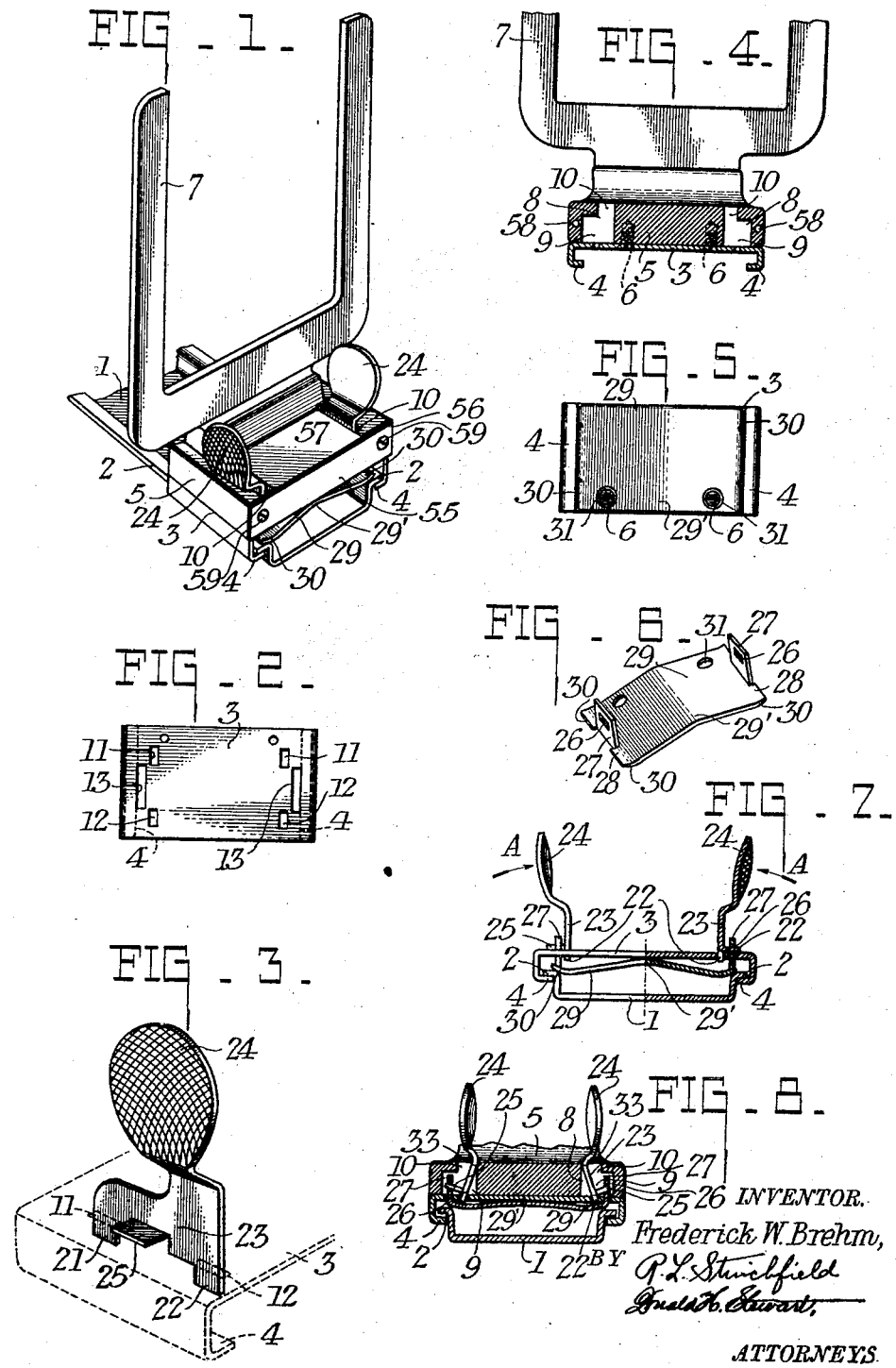

UNITED STATES PATENT OFFICE.

FREDERICK W. BREHM, OF ROCHESTER, NEW YORK, ASSIGNOR TO EASTMAN KODAK COMPANY, OF ROCHESTER, NEW YORK, A CORPORATION OF NEW YORK.

CAMERA-LENS-CARRIAGE CLAMP.

Application filed September 30, 1924. Serial No. 740,856.

*To all whom it may concern:*

Be it known that I, FREDERICK W. BREHM, a citizen of the United States of America, residing at Rochester, in the county of Monroe and State of New York, have invented certain new and useful Improvements in Camera-Lens-Carriage Clamps, of which the following is a full, clear, and exact specification.

This invention relates to photography and more particularly to lens carriage clamps for photographic cameras. One object of my invention is to provide a clamp which will hold the lens carriage firmly against the track and which is arranged to also permit the carriage to slide freely on the track when the clamp is released. Another object is to provide a clamp which is constructed of but few parts which may be easily assembled. Another object is to provide a clamp which will exert a clamping action over the entire area of the carriage contacting with the track. Another object is to provide a lens carriage clamp in which the natural downward pressure upon the lens carriage is utilized in operating the lens carriage clamp; and other objects will appear from the following specification, the novel features being particularly pointed out in the claims at the end thereof.

When a lens carriage is moved to open or close a camera along the camera track a downward pressure is almost always exerted on the lens carriage regardless of the clamp releasing mechanism which is used on the particular camera. This is probably due to holding the camera at approximately the waist level in which position the majority of pictures are taken. I have found that I can use this force to advantage to assist in releasing the clamp of the lens carriage, making a slide block which will operate easily and one which will lock firmly although this invention is not limited to the use of the downward pressure, as will be fully described hereinafter.

In the drawing, wherein like reference characters denote like parts throughout:

Fig. 1 is a perspective view of a lens carriage clamp constructed in accordance with and illustrating one form of my invention;

Fig. 2 is a bottom plan view of the slide plate;

Fig. 3 is an enlarged detail perspective of one of the finger grips;

Fig. 4 is a part elevation and part section through certain parts of the slide block;

Fig. 5 is a bottom plan view of the bottom of the lens carriage clamp;

Fig. 6 is a detail perspective of the clamping spring used in my preferred slide block;

Fig. 7 is a part section and part elevation of parts of the slide block in clamping position; and Fig. 8 is a part section and part elevation of the slide block clamping mechanism with the clamping spring released from its operative position.

Broadly my invention comprises a lens carriage in which the weight of the carriage is supported solely upon a spring. This spring is heavy enough to hold the carriage comparatively rigid by acting against a relatively fixed slide plate, and will therefore sustain the lens carriage in its operative position. When being moved however in grasping the finger grips the natural downward force may be utilized to assist the clamp actuating mechanism to flex the spring thereby providing clearance for the rails so that the carriage may slide freely thereon.

As a typical example illustrating my invention, there is shown in Fig. 1 a track 1 which is a well known type having outwardly flared rail portions 2 which are engaged by the slide plate 3, the ends 4 of which are bent about portions 2 of the track. Plate 3 is attached to block 5 by screws 6, and block 5 supports the lens board supporting yoke 7.

Block 5, as shown in Fig. 4 has recesses 8 cut through to either side of the center, the bottom portions 9 being of greater width than the tops 10. The slide plate 3 has a series of apertures cut in each side, at 11, 12 and 13. Apertures 11 and 12 are to receive lugs 21 and 22 of levers 23, the upper ends of which 24 serve as finger grips. Lugs 25 extend out one side of levers 23. Each of these levers may be turned upon its lugs 21 and 22 as a fulcrum by handle 24.

Lugs 25 project into slots 26 of ears 27 which are bent up from the edges 28 of the spring clamping plate 29. As best shown in Fig. 6 this plate is bowed or bent from a center line 29', the edges to each side of ears 27 being slightly beveled at 30. This spring supports the entire weight of the lens carriage, and is sufficiently strong enough to hold the yoke 7 firmly erect. Plate 3 and flanges 4 of course guide the lens carriage and prevent the carriage from coming off the track. Apertures 31 permit screws 6 to be inserted past spring plate 29 to hold plate 3 against the slide block 5. As will be seen from Fig. 5, the clamping plate 29 is of the same length as the slide block 5, and a clamping action is exerted upon the rails 2 throughout the length of the plate 29.

This slide block can be assembled very quickly in the following manner:

A spring clamp 29 is assembled on slide plate 3 by inserting ears 27 through slots 13, after which a lever 23 is placed with lugs 21 and 22 extending into slots 11 and 12, and with lug 25 entered into a slot 26. The opposite lever is next placed in position in a similar manner except that in entering lug 25 into slot 26 the spring 29 must be flexed considerably to raise ear 27 to the desired height. The unit thus assembled is placed against block 5 and is positioned by sliding finger grips 24 rearwardly into slots 8 from the front. The narrow opening 10 forms a stop for the shank 33 of lever 23 in moving in each direction, while the large opening 9 gives the necessary clearance for lugs 25 and ears 27. When properly positioned the screws 6 are passed through apertures 31 and are screwed into block 5 holding plate 3 fast to the block. A plate 55 bent on a line 56 and having a top plate 57 may be attached to the tapped holes 58 with screws 59 to cover up apertures 8 and this plate may also be used as a name plate for the camera and maker, as it can readily be made in the form of an etched plate.

The operation of my slide block is best illustrated in Figs. 7 and 8. In Fig. 7 edges 30 have binding engagement with the rails 2, and by pressing grips 24 in the direction shown by the arrows A, this tension is released and the parts assume the position shown in Fig. 8. When grips 24 are pressed together the operator also naturally presses downwardly upon the lens carriage materially assisting in flexing the spring 28. It should be noted that grips 24 have considerable mechanical advantage in moving ears 26 upwardly through lugs 25. Consequently a heavy spring 29 may be used. It should also be noted that when in the position shown in Fig. 8 there is considerable clearance between clamping edges 30 and rails 2, and therefore the carriage 5 may slide very freely upon the track 1.

While I have illustrated and described a preferred embodiment of my invention, I contemplate as within the scope of my invention all such embodiments as may come within the scope of the appended claims.

Having thus described my invention what I claim as new and desire to secure by Letters Patent is:

1. In a camera the combination with a track and a lens carriage slidable thereon, of a spring adapted to clamp the lens carriage to the track, said spring forming the sole support for the lens carriage.

2. In a camera the combination with a track and a lens carriage slidable thereover, of a lens carriage clamp including a carriage clamping member and a carriage guiding member, the former member constituting the supporting member of the lens carriage.

3. In a camera the combination with a track and a lens carriage slidable thereover, of a lens carriage clamp including a carriage clamping member and a carriage guiding member adapted to engage different sides of the camera track, one member being flexible and constituting the support for the lens carriage.

4. In a camera, the combination with a track and a lens carriage movable thereover, of a clamp for holding the lens carriage in a set position including a slide plate and a spring, the latter forming the sole support for the lens carriage.

5. In a camera the combination with a track and a lens carriage movable thereover, of a clamp for holding the lens carriage in a set position, a spring adapted to engage the track and to support the lens carriage and means for flexing the spring to release the clamp from the track.

6. In a camera the combination with a track and a lens carriage movable thereover, of a clamp for holding the lens carriage in a set position, a spring adapted to engage the track and to support the lens carriage, a slide plate having portions adapted to engage the camera track on a side opposite that engaged by the spring, a downward pressure upon the lens carriage flexing the spring and releasing the clamping relation between the spring and slide plate.

7. In a camera the combination with a track, and a lens carriage movable thereon, of a clamp for locking the carriage to the track including a clamping spring, and means associated with the spring for moving the ends thereof from clamping engagement with the track.

8. In a camera the combination with a track, and a lens carriage movable thereon, of a clamp for locking the carriage to the track including a clamping spring, a finger grip mounted on the lens carriage and having a lug extending from one side thereof to engage a portion of the spring, whereby the spring may be moved from clamping engagement with the track.

9. In a camera, the combination with a track and a lens carriage movable thereon, of a clamp for locking the carriage to the track including a spring clamping member normally having a binding engagement with the track, levers mounted on the lens carriage for moving the clamping member from its normal position, the spring action of the clamping member normally holding the levers from each other and permitting the levers to be moved together as the spring clamping member is flexed.

10. In a camera, the combination with a track, and a lens carriage movable thereon, of a clamp for locking the carriage to the track, said clamp including a spring having portions normally pressed into clamping engagement with the track and having ears projecting therefrom, levers fulcrumed on the lens carriage engaging the ears, said levers having operating grips by which they may be moved to release the clamping spring from the track.

11. In a camera, the combination with a track, and a lens carriage movable thereon, said lens carriage being provided with a slide plate and a clamping plate both adapted to contact with the track, the slide plate being adapted to engage one portion of the track and the clamping plate being adapted to engage another portion of the track, and the clamping plate being positioned to sustain the weight of the lens carriage.

12. In a camera the combination with a track, and a lens carriage movable thereover, of a clamp for locking the lens carriage to the track including a flexible plate, said flexible plate being adapted to rest on the track and to support the weight of the lens carriage.

13. In a camera, the combination with a track, and a lens carriage movable thereover, of a clamp for holding the lens carriage upon the track including a spring clamping member having ears extending from the spring, an apertured slide plate carrying levers, said levers engaging the ears of the spring extending through the apertures in the slide plate.

14. In a camera, the combination with a track, and a lens carriage movable thereover, of a clamp for holding the lens carriage on the track including a slide plate in which there are two sets of apertures, a clamping plate having extensions projecting through one set of apertures in the slide plate, and operating levers engaging another set of apertures in the slide plate and having portions engaging the extensions of the clamping plate whereby the clamping plate may be moved by the levers relative to the slide plate.

15. In a camera, the combination with a track and a lens carriage movable thereon, of a clamp for holding the lens carriage on the track including a slide plate, a spring clamping plate having ears extending up toward the slide plate, said spring being flexed so as to normally exert a pull on the ears, levers mounted upon the slide plate engaging the ears, and stops limiting the movement of the levers in one direction, the pull exerted by the spring acting on the levers through the engaged levers and ears normally tending to hold the levers against the stops.

Signed at Rochester, New York this 26th day of September, 1924.

FREDERICK W. BREHM.